United States Patent
Chou

(10) Patent No.: US 7,509,485 B2
(45) Date of Patent: Mar. 24, 2009

(54) METHOD FOR LOADING A PROGRAM MODULE IN AN OPERATING SYSTEM

(76) Inventor: Hui-Ling Chou, 48, Lane 107, Kang-Chuang Street, Chu-Tung, Hsin-Chu Hsien (TW)

( * ) Notice: Subject to any disclaimer, the term of this patent is extended or adjusted under 35 U.S.C. 154(b) by 614 days.

(21) Appl. No.: 10/233,630

(22) Filed: Sep. 4, 2002

(65) Prior Publication Data

US 2004/0045011 A1    Mar. 4, 2004

(51) Int. Cl.
*G06F 9/24* (2006.01)

(52) U.S. Cl. ............... 713/100; 713/1; 713/2; 710/104; 710/62; 710/8

(58) Field of Classification Search ............ 713/1, 713/2, 100; 710/104, 62, 8
See application file for complete search history.

(56) References Cited

U.S. PATENT DOCUMENTS

| | | | |
|---|---|---|---|
| 4,075,679 A | | 2/1978 | Christopher et al. |
| 5,485,574 A | * | 1/1996 | Bolosky et al. ............ 714/35 |
| 5,634,058 A | * | 5/1997 | Allen et al. ............... 717/163 |
| 5,933,643 A | * | 8/1999 | Holler ....................... 717/158 |
| 6,119,186 A | * | 9/2000 | Watts et al. ................ 710/104 |
| 6,345,256 B1 | | 2/2002 | Milsted et al. |
| 6,571,215 B1 | * | 5/2003 | Mahapatro .................. 705/8 |
| 6,591,290 B1 | * | 7/2003 | Clarisse et al. ............ 709/205 |
| 6,658,571 B1 | * | 12/2003 | O'Brien et al. ............ 713/200 |
| 6,718,543 B2 | * | 4/2004 | Arai et al. .................. 717/158 |
| 6,848,098 B1 | * | 1/2005 | Tsuboi ...................... 717/151 |
| 6,948,157 B2 | * | 9/2005 | Larsson et al. ............ 717/139 |
| 6,993,755 B1 | * | 1/2006 | Ungar ........................ 717/158 |
| 2001/0011369 A1 | * | 8/2001 | Satoyama et al. ............. 717/4 |

\* cited by examiner

*Primary Examiner*—Abdelmoniem Elamin
(74) *Attorney, Agent, or Firm*—Stolowitz Ford Cowger LLP

(57) ABSTRACT

A method for loading a program module in an operating system is provided. An application program is launched and at least one main program module thereof is loaded in an operating system. Executing the application program, and checking if one program module thereof to be executed has been loaded. When the program module has not yet been loaded, the program module is loaded in the operating system, and the time of execution thereof is recorded in an execution frequency record of the program modules used corresponding to the application program.

35 Claims, 2 Drawing Sheets

METHOD FOR LOADING A PROGRAM MODULE IN AN OPERATING SYSTEM

BACKGROUND OF THE INVENTION

1. Field of the Invention

The present invention relates to a method for loading a program module in an operating system, and more particularly to a method for loading program modules in the operating system, which can shorten the loading time.

2. Description of the Prior Art

The use of film scanners that convert photographic film images into digital files that can be manipulated and processed using computer software such as Adobe Photoshop is well known. Such systems facilitate the user's selection of desired zoom, crop and magnification parameters. These parameters are to be employed when converting the original film image or resulting digital image file into a hardcopy print by means of an appropriate printer, such as optical printer, or digital printer such as inkjet or thermal dye printer or other digital printer system. Initially, such systems would be found at commercial establishments where qualified personnel would be available to advise and assist the customer in selecting appropriate print parameters. With the growing availability of personal film scanners and low cost digital color printers, users who have minimal familiarity with image processing and reproduction technology increasingly perform such operations in the home on personal computers.

Existing photo manipulation software, exemplified by the Adobe Photoshop program allows users to alter characteristics of an image and display it in modified form on a computer monitor/video display. The quality of the displayed image will be dependent on the resolution of the scanner used to capture the image as well as the resolution of the display monitor.

Many existing software applications support "plug-in" modules and are therefore referred to as client applications to such plug-in modules. These plug-in modules provide the client applications with new or extended services. Plug-ins may, for example, provide specially tailored image filtering functionality to client applications. Adobe Systems, Inc.™ currently offers several client applications, which support plug-in modules. One such client application is Photoshop™, a popular image processing application. Due to the popularity of Photoshop, many software companies develop Photoshop-compatible plug-in modules to extend the services of Photoshop in order to satisfy the requirement of the user.

However, when an application program such as Photoshop is launched, all of the program modules thereof are loaded in the operating system at the same time. The user needs to wait for a long time to complete the loading of all the program modules including the plug-in modules. Moreover, when the user operates the application program, some program modules or plug-in programs provide functions, which are seldom used, resulting in the waste of memory volume of the hard disk, which stores all of the program modules of the application program. And, the available memory space is also reduced. The conventional method for loading program modules in the operating system is a waste time and a waste of hard disk memory. Even, the user needs to prepare a hard disk with a larger memory volume in order to enable and execute the application program he/she desires, which results in a burden of cost.

Accordingly, it is an intention to provide a method for loading a program module in an operating system, which can overcome the above drawbacks.

SUMMARY OF THE INVENTION

It is one objective of the present invention to provide a method for loading a program module in an operating system, in which when an application program is launched, program modules thereof are not loaded in the operating system except for the main program modules. Once the user desires to use the function of an unloaded program module, the program module is then loaded. As a result, the time spent loading program modules when launching the application program is shortened and the memory occupied by the program modules is saved.

It is another objective of the present invention to provide a method for loading a program module in an operating system, in which an application program is launched, whether a program module thereof needs to be loaded is based on the execution frequency thereof. Thus, the time for loading program modules when launching the application program is shortened and the memory occupied by the program modules is saved.

It is a further objective of the present invention to provide a method for loading a program module in an operating system, in which an application program is launched, which program modules thereof need to be loaded is based on the requirement of a user.

In order to achieve the above objectives of this invention, the present invention provides a method for loading a program module in an operating system. The present method comprises launching an application program and loading at least one main program module thereof in an operating system. Executing the application program and checking if one program module thereof to be executed has been loaded. When the program module has not yet been loaded, loading the program module in the operating system, and recording one time of execution thereof in an execution frequency record of program modules corresponding to the application program. Accordingly, the time for loading the program modules when launching the application program is shortened and the memory occupied by the program modules is saved.

BRIEF DESCRIPTION OF THE DRAWINGS

The objectives and features of the present invention as well as advantages thereof will become apparent from the following detailed description, considered in conjunction with the accompanying drawings.

DESCRIPTION OF THE PREFERRED EMBODIMENT

The present method for loading a program module in an operating system can be adopted in loading an application program having various program modules, for example plug-in programs, in the operating system. The present method is suitable for application programs including various image editing software, for example, Adobe Photoshop, Corel PHOTOPAINT™, Corel Painter, Microsoft PowerPoint and Word. The operating system compatible with the above application programs, such as Microsoft Window, Macintosh operating system and Linux operating system, can be used in the present invention.

Figure 1:
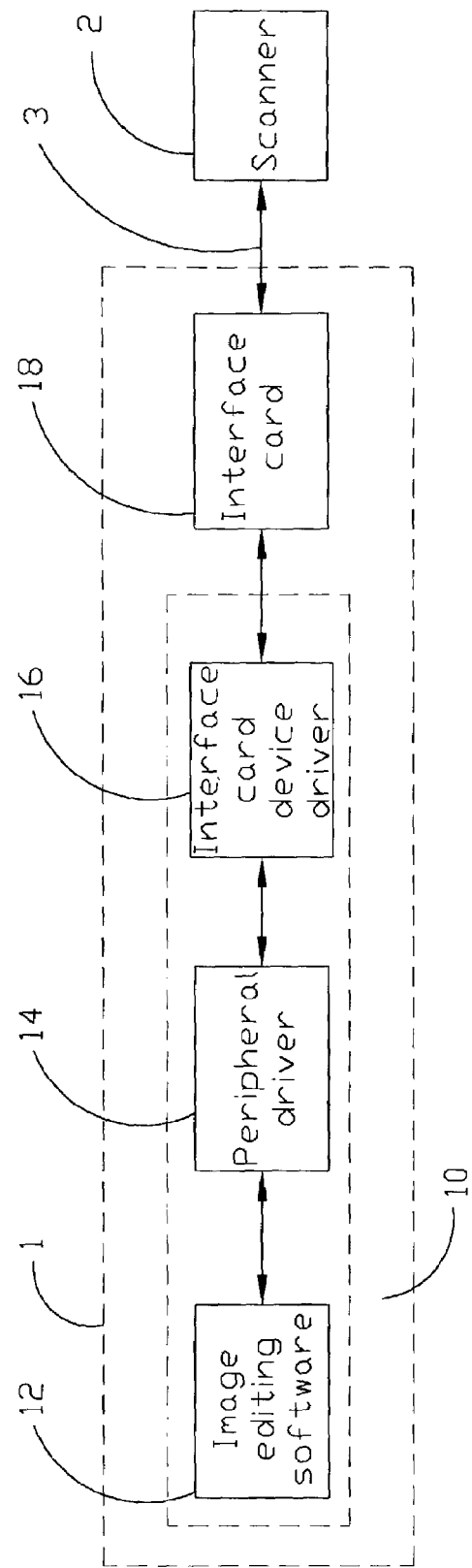
FIG. 1 illustrates communications between an application program executing on a computer workstation and a scanner.

FIG. 1 illustrates communications between an application program executing on a computer workstation 1 and a scanner 2. The user can process the image data captured by the scanner 2 on the computer workstation 1 by operating an image editing software 12 installed in the computer workstation 1. The scanner 2 is connected to the computer workstation 1 using a connecting cable 3. As a peripheral device, the scanner 2 would likely be set up as shown in FIG. 1 with the image editing software 12, a peripheral driver 14, an interface card device driver 16, an interface card 18 and an operating system 10, all hosted on the computer workstation 1.

The image editing software 12 is any software application that would access the scanner 2 to retrieve data or is capable of manipulating image data, such as Adobe Photoshop. The peripheral driver 14 is a software application that formats communications between the image editing software 12 and the scanner 2. The interface card device driver 16 is a software application that formats communications as required for transfer across the connecting cable 3 to the scanner 2. The operating system 10 is a software application that provides a user interface for invocation and a platform for operation of other software applications. The computer workstation 1 also has an interface card 18, which receives communications from the computer workstation 1, placing the communications on the connecting cable 3 as required for delivery to the scanner 2. The configuration of FIG. 1 allows the image editing software 12 to control the scanner 2 by communicating with the peripheral driver 14. This properly formats the scanner commands from the image editing software 12 and provides the properly formatted commands to the interface card device driver 16, which then packages those commands in a format for transportation to the interface card 18 and across the connecting cable 3 to the scanner 2.

The image editing software 12, such as Adobe Photoshop, provides many program modules with different functions for processing and editing the images. As the image editing software 12 becomes increasingly popular, many software companies have developed various plug-in programs compatible with the image editing software 12 so as to diversify the designs and functions of the image editing software 12. However, the user does not utilize all the functions provided by the program modules of the image editing software 12. Which function would be utilized is based on the requirements of the user and the user's customs for manipulating the image editing software 12. Some functions provided by certain program modules of the image editing software 12 is seldom used or never used. When an application program, such as the image editing software 12, is launched, the program modules having a low execution frequency or not executed at all are not loaded in the operating system 10, thus the time for loading the program modules of the application program would be significantly reduced. The memory volume of the computer workstation 1 occupied by the program modules is also saved. And, the memory volume can be more effectively used.

The present invention provides a method for loading a program module in an operating system, in which when the application program, for example, the image editing software 12, is launched, only loading main program modules thereof in the operating system 10. Once the user desires to operate a function provided by a certain unloaded program module, the program module is then loaded in the operating system 10. At the same time, one time use of execution of the program module is recorded in an execution frequency record as a reference to determine whether to automatically load the program module when the application program is launched next time.

The present method can be implemented with an application executed by a central processing unit (CPU) of the computer workstation 1. The present method will be described in detail in accordance with one preferred embodiment with reference to the accompanying drawing of FIG. 2.

Figure 2:
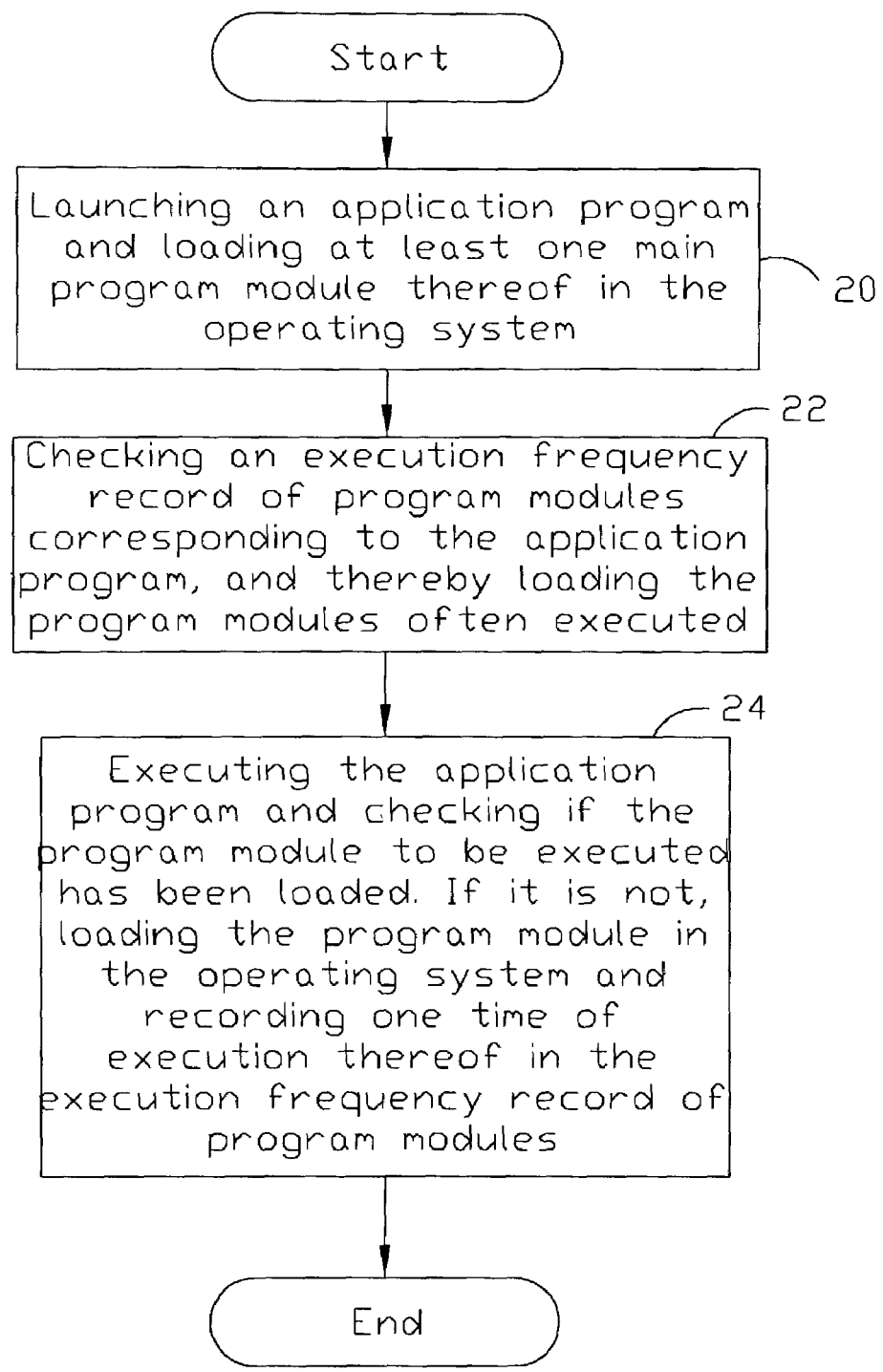
FIG. 2 is a flow chart of the present method according to one preferred embodiment of the present invention.

Referring to FIG. 2, at step 20, launching an application program, such as the image editing software Photoshop, and loading of at least one main program module in the operating system 10. The main program modules comprise all related program modules enabling the application program to execute basic functions, which is based on the application program itself. Next, at step 22, checking an execution frequency record of program modules corresponding to the application program, and accordingly automatically loading a program module having an execution frequency not less than a predetermined execution frequency. The central processing unit of the computer workstation 1 can automatically check the execution frequency record of program modules corresponding to the application program. And, in accordance with the execution frequency record, the program module the user often utilizes is automatically loaded. That is, the program modules having an execution frequency not less than the predetermined execution frequency is automatically loaded in the operating system 10. The program module loaded in the operating system 10 is displayed on a user interface of the application program as an icon. The user can operate the function of the program module by only clicking the icon via a mouse. The program module can be a plug-in program, and the execution frequency record can be an execution frequency-mapping table. The predetermined execution frequency is a variable value, which is based on the requirement of the user operating the application program.

Following, at step 24, executing the application program and checking if the program module to be executed has been loaded. When the program module is not loaded in the operating system 10, automatically loading the program module, and recording the one time execution thereof in the execution frequency record. The record is used as a reference to determine whether automatically loading the program module when the application program is launched the next time. The program module loaded in the operating system 10 can be displayed on a user interface of the application program as an icon. The user can operate the function of the program module by clicking the icon via the mouse.

By the present invention, when the application program is launched, the program modules of the application program that needs to be loaded in the operating system 10 is significantly reduced, and thus the loading time is shortened. The memory volume of the computer workstation 1 is also saved. It is very advantageous for the image editing software with large program modules to proceed with complicated image processing, to use the present method to load the program modules of the image editing software in the operating system 10 when launching the image editing software.

The preferred embodiment is only used to illustrate the present invention, it is not intended to limit the scope thereof. Many modifications of the embodiment can be made without departing from the spirit of the present invention.

What is claimed is:

1. A method, comprising:
   launching an application program including loading a main program module in an operating system;
   checking if a desired program module has previously been loaded, wherein the desired program module is a plug-in program that provides additional functionality not provided by the main program module;

loading the desired program module in the operating system in response to a request for the additional functionality; and recording one time of execution thereof in an execution frequency record of program modules corresponding to the application program if the desired program module had not previously been loaded.

2. The method of claim 1, further comprising:

checking the execution frequency record of program modules; and automatically loading the program module when the execution frequency is greater than a predetermined execution frequency in the operating system.

3. The method of claim 1, wherein the application program is executable without loading the desired program module.

4. The method of claim 3, wherein the desired program module is displayed on a user interface of the application program as an icon.

5. The method of claim 1, wherein the desired program module is displayed on a user interface of the application program as an icon.

6. The method of claim 1, wherein the execution frequency record of program modules is an execution frequency-mapping table.

7. The method of claim 2, wherein the predetermined execution frequency of program modules is determined based at least in part on an expected frequency of use of the additional functionality.

8. The method of claim 1, wherein the application program includes an image editing software program.

9. A method for loading a program module in an operating system, comprising:

launching an application program;

checking an execution frequency record of a program module, wherein the program module provides additional functionality to the application program; and loading the program module based at least in part on the execution frequency record, wherein the application program is executable without loading the program module.

10. The method of claim 9, further comprising automatically loading the program module when the execution frequency record is not less than a predetermined execution frequency, wherein the predetermined execution frequency is a variable value based at least in part on a predicted requirement of the user of the application program.

11. The method of claim 9, wherein the execution frequency record comprises an execution frequency-mapping table.

12. The method of claim 9, further comprising recording one time of execution in the execution frequency record of the program module when the program module is loaded.

13. A computer-readable medium having computer-executable instructions, that when executed, cause a computer to perform a method comprising:

launching an application program comprising a main program module;

checking an execution frequency record of a plug-in program module, wherein the plug-in program module provides functionality to the application program that is not provided by the main program module, and loading the plug-in program module based at least in part on the execution frequency record.

14. The computer-readable medium of claim 13, wherein the method further comprises:

loading the plug-in program module when the execution frequency record is not less than a predetermined execution frequency, wherein the predetermined execution frequency is a variable value based at least in part on a frequency of use of the functionality.

15. The computer-readable medium of claim 13, wherein the application program is executable without loading the plug-in program module.

16. The computer-readable medium of claim 13, wherein the method further comprises recording one time of execution in the execution frequency record of the program module when the plug-in program module is loaded.

17. An apparatus comprising:

an execution frequency record of a plug-in program module of an application program, wherein the plug-in program module provides additional functionality not provided by the application program; and a computer configured to:

execute the application program; and check the execution frequency record and load the plug-in program module based at least in part on the execution frequency record, wherein the application program is executed without loading the plug-in program module.

18. The apparatus of claim 17, wherein the computer is further configured to:

load the plug-in program module when the execution frequency record is not less than a predetermined execution frequency, wherein the predetermined execution frequency is a variable value based at least in part on a predicted amount of use of the additional functionality.

19. The apparatus of claim 17, wherein the execution frequency record comprises an execution frequency-mapping table.

20. The apparatus of claim 17, wherein the computer is further configured to record one time of execution in the execution frequency record of the program module when the plug-in program module is loaded.

21. A method, comprising:

launching an application program and loading at least one main program module thereof in an operating system;

executing the application program and checking if a first program module thereof to be executed has been loaded;

loading the first program module in the operating system and recording one time of execution thereof in an execution frequency record of program modules corresponding to the application program when the first program module has not yet been loaded; and checking the execution frequency record of program modules and thereby automatically loading a second program module with an execution frequency not less than a predetermined execution frequency in the operating system, wherein the application program is executable without loading either of the first and second program modules.

22. The method of claim 21, wherein the second program module includes a plug-in program.

23. The method of claim 22, wherein the plug-in program having been loaded in the operating system is displayed on a user interface of the application program as an icon.

24. The method of claim 21, wherein the second program module having been loaded in the operating system is displayed on a user interface of the application program as an icon.

25. The method of claim 21, wherein the execution frequency record of program modules is an execution frequency-mapping table.

26. The method of claim 21, wherein the application program includes an image editing software program.

27. The method of claim 1, further comprising automatically loading the desired program module in the operating system when the application program is launched based at least in part on the execution frequency of the desired program module recorded in the execution frequency record.

28. The method of claim 9, further comprising, if the program module is not loaded in response to the launching, loading the program module and recording one time of execution in the execution frequency record of the program module.

29. The method of claim 21, wherein the first and second program modules provide additional functionality not provided by the main program module, and wherein the predetermined execution frequency of program modules is determined based at least in part on an expected usage of the additional functionality.

30. A method, comprising:
launching an application program in an operating system;
detecting when a program module to be executed by the application program has not be previously loaded in the operating system; and
automatically preloading the program module in the operating system according to how often the program module is executed by the application program without being previously loaded in the operating system.

31. The method according to claim 30, wherein the application program was previously launched in the operating system without executing the program module.

32. A method, comprising:
launching an application program in an operating system;
detecting when a program module executed by the application program has not been previously loaded in the operating system;
recording an execution frequency for the program module being executed by the application program without having been previously loaded in the operating system; and
automatically loading the program module with the application program according to the execution frequency.

33. The method according to claim 32, wherein the program module provides additional functionality to the application program.

34. An apparatus comprising:
one or more processors configured to
launch an application program in an operating system;
detect when a program to be executed by the application program has not been previously loaded in the operating system; and
automatically preload the program in the operating system according to how often the program is executed by the application without being previously loaded in the operating system.

35. The apparatus according to claim 34, wherein the one or more processors are further configured to:
receive a request to execute the program.

* * * * *

UNITED STATES PATENT AND TRADEMARK OFFICE
CERTIFICATE OF CORRECTION

PATENT NO.        : 7,509,485 B2                                      Page 1 of 1
APPLICATION NO.   : 10/233630
DATED             : March 24, 2009
INVENTOR(S)       : Hui-Ling Chou It is certified that error appears in the above-identified patent and that said Letters Patent is hereby corrected as shown below:

At column 6, line 21, delete "executed" and insert -- executable --, therefor.

At column 7, line 19, delete "be" and insert -- been --, therefor.

Signed and Sealed this

First Day of September, 2009

David J. Kappos
*Director of the United States Patent and Trademark Office*